Dec. 24, 1946.                J. A. LONDON                 2,413,058
                           MULTISHUTTER CAMERA
                   Filed Oct. 9, 1944          4 Sheets-Sheet 1

J. A. London
INVENTOR.

BY
ATTORNEYS.

Dec. 24, 1946. J. A. LONDON 2,413,058
MULTISHUTTER CAMERA
Filed Oct. 9, 1944 4 Sheets-Sheet 2
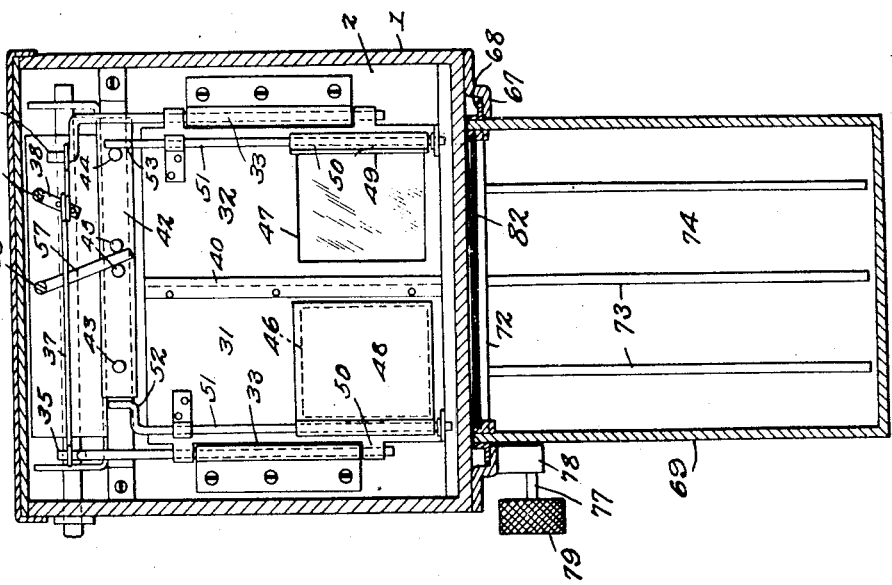
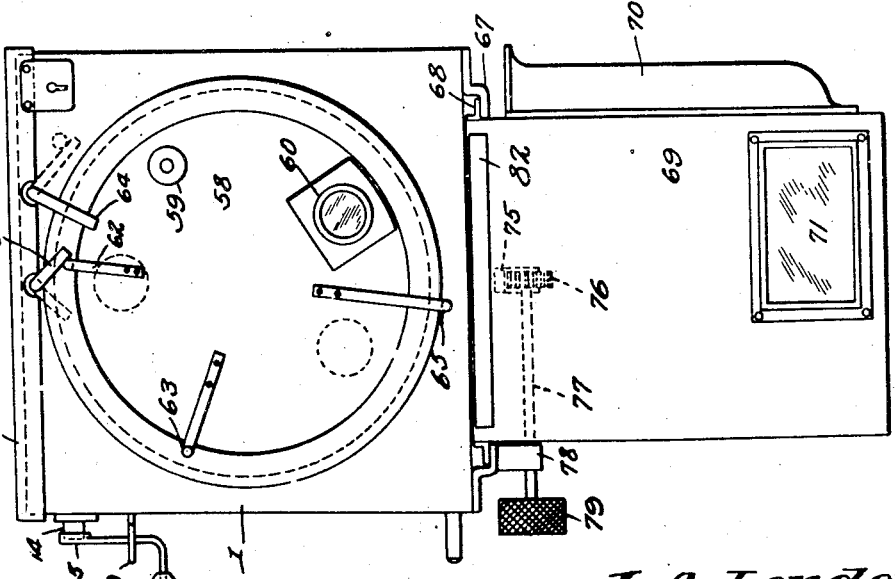
J. A. London
INVENTOR.
BY
ATTORNEYS.

Dec. 24, 1946.　　　J. A. LONDON　　　2,413,058
MULTISHUTTER CAMERA
Filed Oct. 9, 1944　　　4 Sheets-Sheet 3
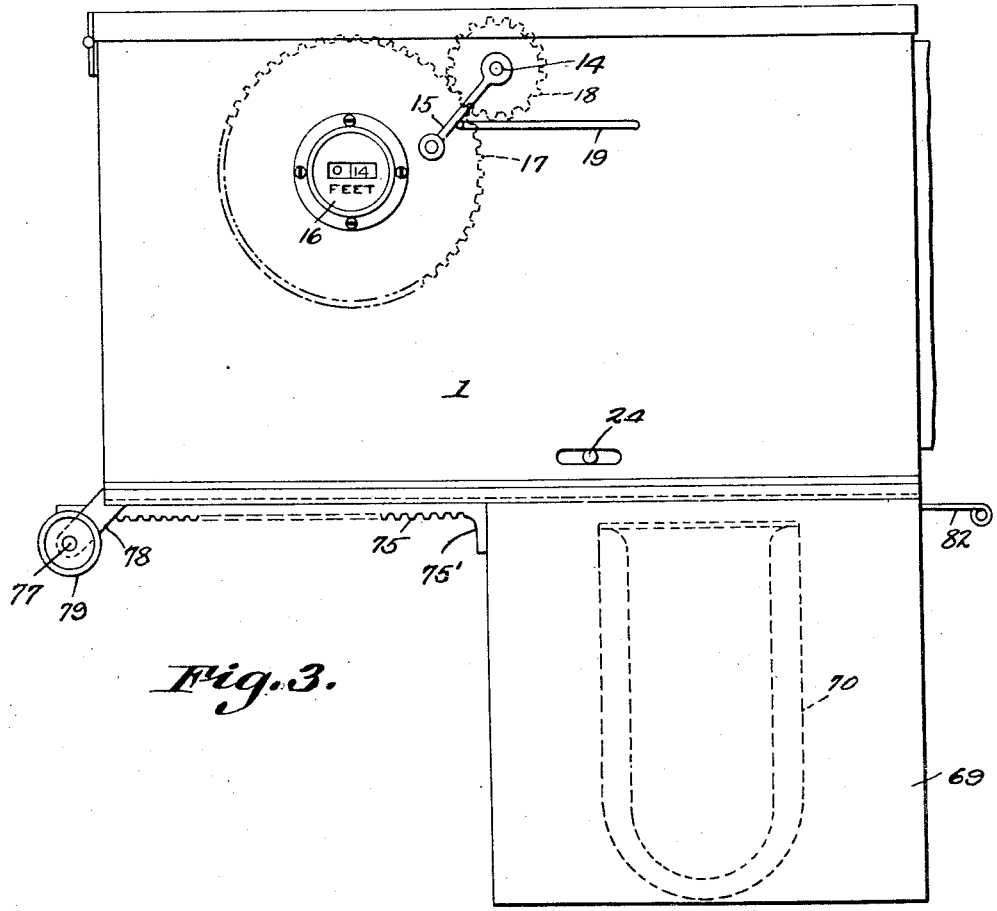
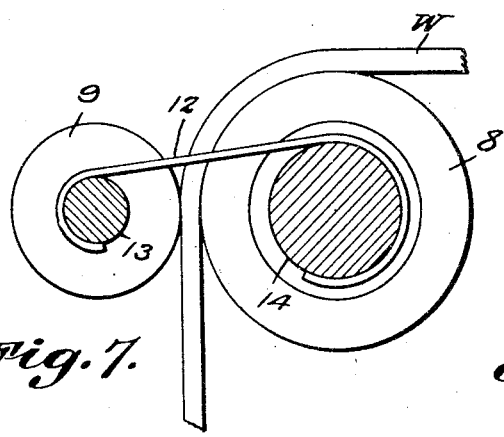
J. A. London
INVENTOR.
BY
ATTORNEYS.

Dec. 24, 1946.        J. A. LONDON        2,413,058
MULTISHUTTER CAMERA
Filed Oct. 9, 1944        4 Sheets-Sheet 4
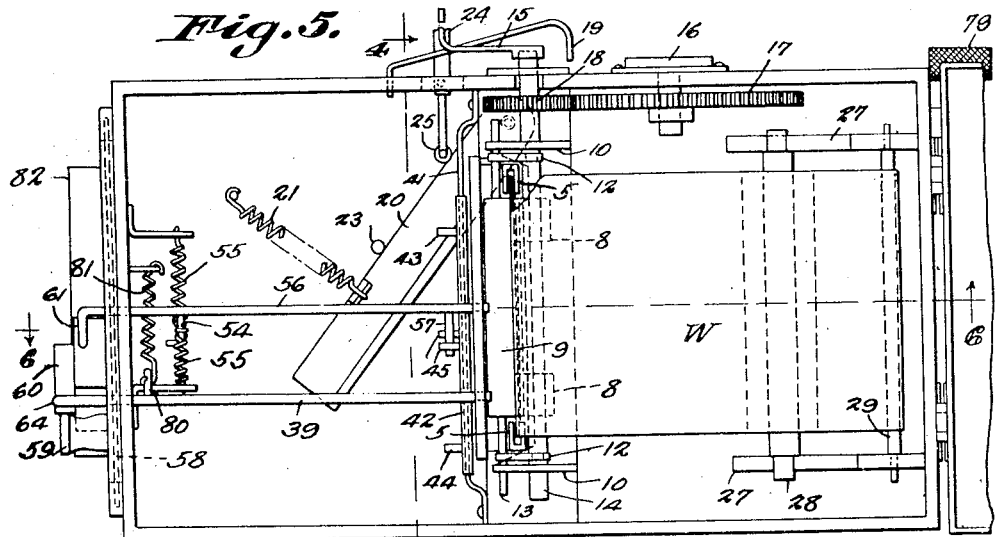
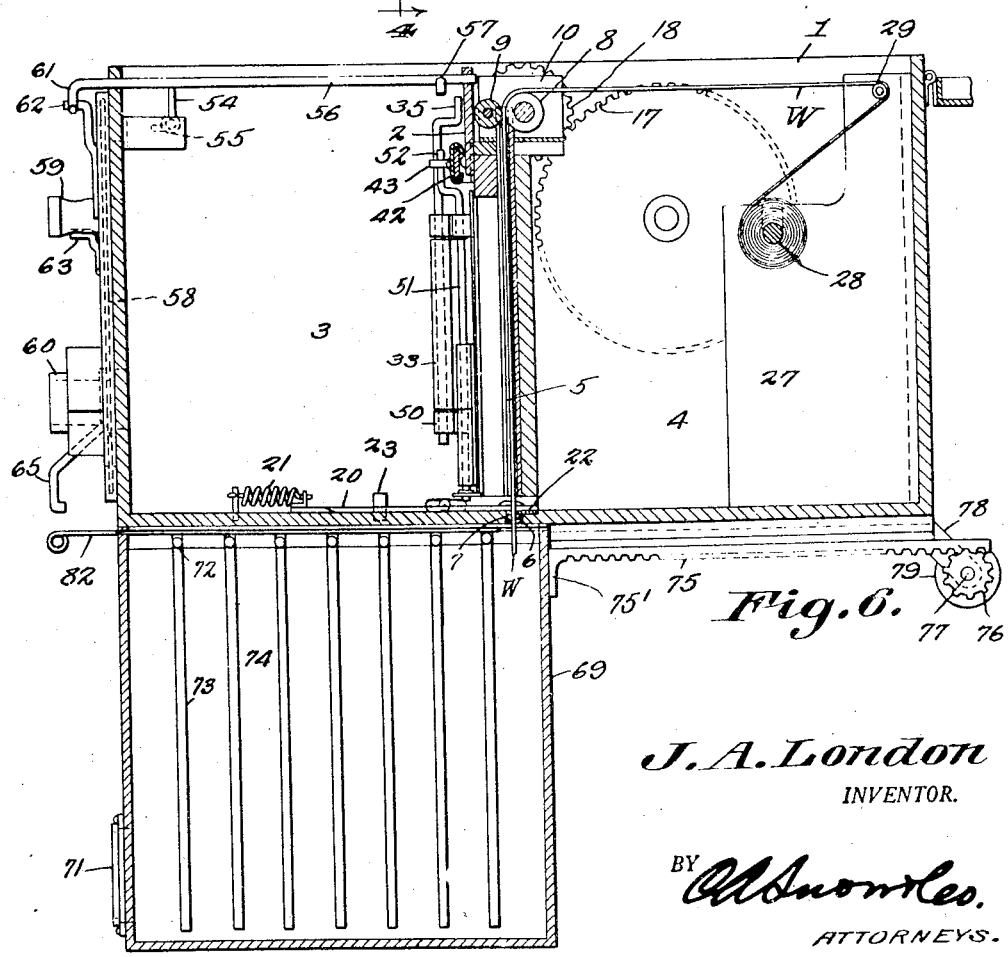
J. A. London
INVENTOR.
BY
ATTORNEYS.

Patented Dec. 24, 1946

2,413,058

UNITED STATES PATENT OFFICE 2,413,058

MULTISHUTTER CAMERA

James Allen London, Los Angeles, Calif.

Application October 9, 1944, Serial No. 557,859

12 Claims. (Cl. 95—38)

This invention relates to apparatus for use by photographers and an object is to provide in one structure both a camera and a developing apparatus whereby sheet material on which the image is projected can be fed, at will, into a developing apparatus from which it subsequently can be removed for distribution.

A further object is to provide photographic apparatus, the camera portion of which has a lens mounted for movement to any one of several selected positions, there being an arrangement of shutters by which the size of the photograph produced can be varied at will, depending upon the position of the lens and selection of the shutters.

A further object is to provide apparatus of this character which can utilize a web of sensitized paper or the like on which one or more exposures can be made without shifting the web on which a succession of large, or large and small, exposures can be made.

A still further object is to provide a means for shearing off the web after the exposed portions have been directed into a developing apparatus.

A still further object is to provide the camera with a shiftable lens, the movement of which to any predetermined position serves to open a selected shutter whereby an exposure of the proper area can be made upon actuation of the ordinary lens shutter.

A still further object is to provide developing apparatus positioned to receive the exposed portions of the sensitized material, said apparatus being shiftable to bring the developed material in regular successions into position where it can be removed readily by the user for drying and mounting.

With the foregoing and other objects in view, which will appear as the description proceeds, the invention consists of certain novel steps in the method and certain details of construction and combinations of parts hereinafter more fully described and pointed out in the claims, it being understood that changes may be made in the method disclosed and in the construction and arrangement of parts without departing from the spirit of the invention as claimed.

In the accompanying drawings the preferred form of the invention has been shown.

In the drawings,

Figure 2 is a front elevation thereof.

Figure 3 is a side elevation.

Figure 4 is a section on line 4—4, Figure 5.

Figure 5 is a top plan view, with the lid open.

Figure 6 is a section on line 6—6, Figure 5.

Figure 7 is an enlarged section through the web feeding rolls.

Figure 1:
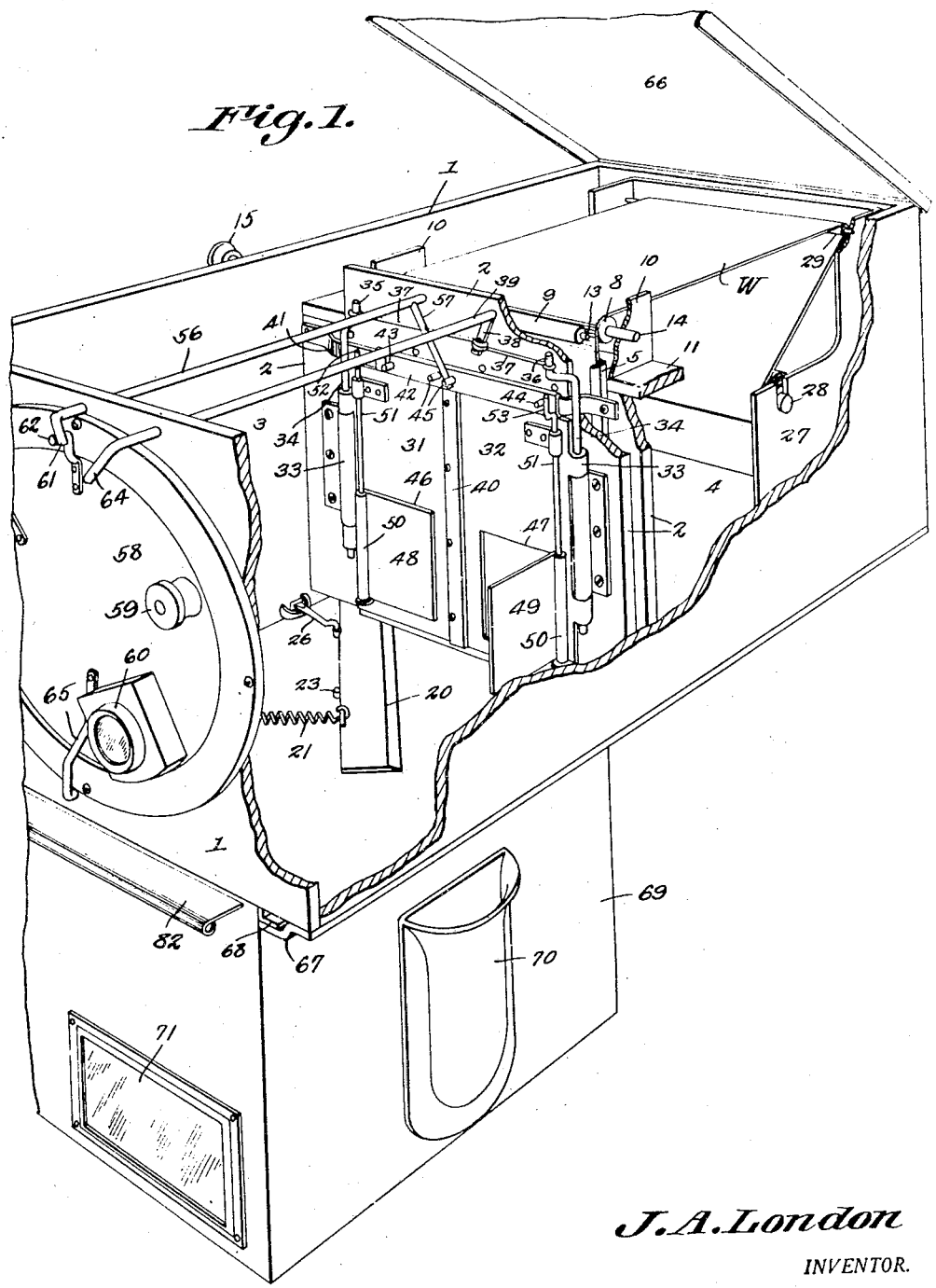
Figure 1 is a perspective view of the apparatus, portions being broken away.

Referring to the figures by characters of reference, 1 designates the casing of the camera portion of the apparatus and this is provided, at an intermediate point, with a transverse partition 2 which divides the interior of the casing into a front compartment 3 and a rear compartment 4.

Opposed guides in the form of channeled strips 5 are located at the back of the partition and positioned vertically at a distance apart substantially equal to the width of the sensitized web to be used in the camera. These guides extend down to the ends of an outlet slot 6 in the bottom of the casing 1 and extending transversely thereof, there being felts 7 in the slot for expanding and closing the slot when empty. However, these felts are capable of being compressed to provide a clearance between them sufficient to receive a sensitized web being delivered from the camera. Obviously, material other than felt can be used for this purpose and the term "felts" is to be construed as covering any such suitable closure material.

Adjacent to the upper ends of the guides are transversely extended feed rolls 8 and 9. Roll 8 is mounted in suitable bearings carried by a cross member 11 forming a part of the partition 2. Roll 9 is loosely mounted in the bearings 10 and is held normally drawn toward the roll 8 by springs 12, as shown particularly in Figure 7, these springs engaging the shaft 13 of roll 9 and the shaft 14 of roll 8.

Shaft 14 is provided at one end with a crank 15 or the like whereby it can be rotated readily, this crank, of course, being located outside of the casing 1 as shown particularly in Figures 2 and 3.

A counter 16 can be located in one wall of the casing and, by means of suitably proportioned gears 17 and 18, motion can be transmitted from shaft 14 to the counter so that said counter thus will serve through the usual mechanism, to indicate the amount of sensitized web which has been exposed. A suitable spring latch 19 can be arranged on one side of the casing 1 where it can act to prevent the crank 15 from being turned in the wrong direction.

Movably mounted on the bottom of the casing 1 is a shearing blade 20 normally held yieldingly in one position by a spring 21. A stationary shearing blade 22 is positioned beneath the partition 5 and adjacent to but back of the path of a web supported in the guides 5, so that when the movable blade 20, which is preferably pivotally mounted at one end, is thrust in one direction, it will cooperate with the blade 22 to shear off a web supported in the path thereof. The shearing blade may be operated in any suitable manner. The spring 21, in the structure shown, serves to hold the blade normally retracted against a stop pin 23. An operating button 24 is extended outwardly through a slot 25 in the side of casing 1 and is connected by a link 26 to the blade 20. Thus when the button is pressed inwardly, this link will cause the blade to swing around toward and past the stationary shearing blade, with the result that material in the path of the moving blade will be severed.

Brackets 27 are located at the sides of the chamber 4 and serve to support a rotatable spool 28 on which is wound an elongated web W of sensitized material. This web is extended upwardly from the spool over a guide roll 29 mounted in the brackets and from this guide roll the web is extended over roll 8 and bent downwardly between said roll and roll 9 to the guides 5. The web is so proportioned as to bridge the space between the guides and at the start of an operation the web is extended substantially to the level of the shearing blade 20. As the web is pinched between the rolls 8 and 9 because of the action of the contracting springs 12, it will be apparent that when the crank 15 is rotated the two rolls will act to feed the web downwardly between the guides.

The partition 2 is provided with a large opening 30, the size of which determines the size of the maximum exposure possible with the camera. The main shutter comprises opposed doors 31 and 32, which are hingedly mounted on the partition 2 at opposite sides respectively of the opening 30, as indicated at 33. Each of the main shutter doors has a pintle 34 rotatable therewith and extended upwardly therefrom and one of the pintles, 34, has a crank 35 normally extended toward the partition 2 while the other pintle 34 has a crank 36 normally extended away from the partition 2. The two cranks are connected by rods 37 or the like to one end of an arm 38 depending from a rock shaft 39 which is journaled at one end in the top portion of partition 2 and, adjacent to its other end, in the front wall of the casing 1. The two main shutter doors 31 and 32 are proportioned to lap at their meeting edges when they are closed, a sealing strip 40 being secured to one of the doors, 31, for lapping the door 32, as shown. Obviously, when the rock shaft 39 is turned in one direction the rods 37 will pull upon the cranks 35 and 36 and cause the two shutter doors 31 and 32 to swing forwardly into the chamber 3 and toward the side walls of the casing so that the opening 30 thus is fully opened. By turning the rod 39 in the opposite direction the shutter doors will be closed together as shown, for example, in Figure 1.

Secured to the partition 2 and extending transversely thereof above the level of the main shutter doors 31 and 32 is a guide bar 41. A sleeve 42 is slidably mounted on this bar and is provided adjacent its ends with tripping pins 43 and 44 respectively, while at a point between its ends there is provided a pair of tripping pins 45.

Each of the doors 31 and 32 has an opening in the lower portion thereof, these openings being indicated at 46 and 47 respectively. Each opening is adapted to be closed normally by a shutter indicated at 48 and 49 respectively, these shutters being hingedly joined to the shutter doors 31 and 32 at those sides thereof nearest the hinges of their main shutter and as indicated at 50.

The pintle 51 of each supplemental shutter 48 and 49 is extended upwardly to a point above the main shutter doors. One of the pintles has a crank 52 at its upper end normally extended forwardly from the partition 2, while the other pintle 51, movable with shutter 49, has a crank 53 at its upper end, also normally extended forwardly from the partition. The tripping pins 43 and 44 are located between but adjacent to the cranks 52 and 53, but normally are out of contact therewith, so that the shutters 48 and 49 can be held normally closed by springs suitably located. For example, these springs can be anchored at one end to the casing as shown at 55, and are located at opposite sides of and secured to an arm 54 extended downwardly from a rock shaft 56. (See Figure 5.)

The rock shaft 56 is journaled at one end in the partition 2 while its other end portion is journaled in the front of the casing 1 near the top thereof. This shaft and shaft 39 are parallel. An arm 57 is extended radially from the shaft 56 and is located between the pins 45. Thus when the arm 57 is swung in one direction it will move sleeve 42 so as to bring pin 43 against crank 52 and open the supplemental shutter 48. When the arm 57 is moved in the opposite direction the sleeve 42 will be shifted so as to bring pin 44 against crank 53, thereby causing the supplemental shutter 49 to open. When the arm 57 is in an intermediate or normal position, both shutters are closed.

A disk-like head 58 is mounted for rotation on the front wall of the casing 1 and has a knob 59 or the like whereby it can be rotated readily. This disk carries, near its margin, a photographic lens tube 60, containing the usual camera lens and the usual lens shutter. As these are of any ordinary type it has not been deemed necessary to illustrate them in detail. It is of course desirable to use a wide angle lens so that an image can be directed onto all exposed portions of a film when any one or all of the shutters are opened.

The rock shaft 56 is provided at its outer or front end with a radial finger 61 which extends into the path of spaced tripping pins 62 and 63 carried by the head 58. These pins are so positioned relative to the lens tube 60 that when the optical axis of the lens is centered on opening 47, the pin 62 will have pressed against the finger 61 and pushed it to the right in Figure 2, thereby opening the supplemental shutter 49, as shown in Figure 1, and exposing a portion of the web W. By then actuating the usual shutter associated with the lens, this portion of the lens exposed through opening 47 can receive the image from the lens. Thereafter, by rotating the head 58 in the opposite direction, the pin 63 can be brought around so as to strike finger 61 to push it to the left in Figure 2. This will result in moving sleeve 42 to the left in Figure 1, so that pin 43 will come against crank 52 and open shutter 48. When this happens the lens will be positioned with its optical axis in front of the opening 46 so that portion of the sensitized material back of the opening will receive the image.

Rock shaft 39 projects forwardly beyond the end of shaft 56 and has the radial finger 64, which is supported outside the path of pins 62 and 63 but in the path of a third tripping pin 65 carried by the head 58. Thus when the head 58 is moved to bring the lens into position adjacent to the top of the vertical diameter of the head, as indicated by a broken line at $a$ Figure 2, said pin 65 will have pushed against the finger 64 and shifted it as shown by broken lines in Figure 2, a distance sufficient to open the two large doors 31 and 32 of the main shutter so that the large opening 30 in the partition is fully exposed to permit the sensitized web to receive an image from the lens. This projection of the image onto the sensitized film when the main shutter is opened, is due to the fact that an ordinary wide angle lens is used.

The top of casing 1 is normally closed by a hinged lid 66 so that the web contained in the casing will be protected from the light.

A track formed by angle strips 67 is arranged on the bottom surface of the casing 1 and is slidably engaged by cleats 68 secured to the sides of a tank 69 for holding developing fluid. This tank has a pocket 70 at one side thereof and opening thereinto through which it can be filled.

A window 71, preferably formed of red glass or the like, is provided in the front wall of the casing or tank 69 so as to permit the contents of the tank to be inspected. Cross rods 72 are seated in the top portions of the tank and from each of them is suspended a series of parallel wires 73, the lower ends of which are located close to the bottom of the tank. Thus these wires, when properly positioned, cooperate to divide the interior of the tank into separate communicating chambers or spaces 74.

A rack 75 is slidable on the bottom of the camera and a cross-head 75' moves therewith. A gear 76 is rotatable with a shaft 77, journaled in brackets 78 at the back of the camera, and meshes with the rack. This shaft has a knob 79 at one end where it can be readily reached for turning and, obviously, by rotating this knob and cross-head the tank can be pushed forwardly at will to receive the sections of sensitized material and support them in the tank one behind the other.

It is thought that the operation of the apparatus will be fully understood from the description thus far given. A roll of sensitized material W is placed in the camera housing 1 with one end portion depending between the guides 5 and down to the outlet slot 6. The head 58 is rotated to make an exposure of the desired size and in the desired position on the web.

Thereafter the shutter of the lens is snapped to complete the exposure, following which roll 3 is rotated to feed the web downwardly into the tank 69, a distance determined by watching the indicator 16. Thereafter the blade 20 is actuated to shear off that portion of the web in the tank. It will drop into the tank, after which the tank can be moved forwardly into position to receive another length of web material. After a desired number of exposed portions have been deposited in the tank a slide 82 forming the top of the tank, can be slid into place over the tank and said tank removed from the camera. Developing fluid is poured into the tank, left therein for a desired length of time, and then poured off. The sheets are then removed and processed as desired.

Any suitable means may be provided for maintaining the main doors 31 and 32 closed. For example, and as shown in Figure 5, an arm 80 can be extended downwardly from the rock shaft 39 and a spring 81 can be secured at one end to this arm and anchored at its other end to the casing. Thus, when the rock shaft is moved away from normal position, the spring will be placed under increased tension.

If desired, a box of any desired proportions can be substituted for tank 69 so as to receive one or more of the dry sections of sensitized material and hold them until they can be carried to a dark room for development.

What is claimed:

1. Photographic apparatus including a casing having a front compartment, a back compartment and a partition therebetween having an opening, means for feeding sensitized material across the back of the opening, a main shutter for closing the opening, said shutter having a smaller opening, a supplemental shutter on the main shutter normally closing the smaller opening, a lens supported for movement in a circle to a selected position relative to the casing to align its optical axis with the smaller opening and, to a second position, to project an image onto the film when the main shutter is opened, tripping means movable in a circular path with the lens, and separate means operatively connected to the respective shutters and controlled by said movement of the lens and the tripping means for opening the shutter of the opening aligned with the lens when in said position.

2. Photographic apparatus including a casing having separate compartments, a normally closed main shutter between the compartments, separate normally closed supplemental shutters carried by the main shutter, means in one of the compartments for supporting a sheet of sensitized material across the shutters, a normally closed lens eccentrically mounted on the casing, said lens being mounted for movement in a circle to any one of a series of selected positions, said lens when in any one of said positions constituting means for projecting an image into the area defined by one of the closed supplemental shutters when the lens is exposed, and separate means operated by the movement of the lens to one selected position for opening the main shutter and, when moved to other positions, for opening the respective supplemental shutters associated with said positions.

3. Photographic apparatus including a casing having separate compartments, a normally closed main shutter between the compartments, separate normally closed supplemental shutters carried by the main shutter, means in one of the compartments for supporting a sheet of sensitized material across the shutters, a normally closed lens eccentrically mounted on the casing, said lens being mounted for movement in a circle to any one of a series of selected positions, said lens when in one of said positions constituting means for projecting an image into the area defined by the main shutter when the lens is exposed, and when in its other positions constituting means for projecting the image into the areas defined by the respective supplemental shutters when the lens is opened and means operated by the movement of the lens to a selected position for opening the shutter associated with said position, said means including a rock shaft, a tripping element movable with the lens, means operated thereby for rocking the shaft, and means actuated by the shaft for shifting a shutter to open position.

4. Photographic apparatus including a casing having separate compartments, a normally closed main shutter between the compartments, separate normally closed supplemental shutters carried by the main shutter, means in one of the compartments for supporting a sheet of sensitized material across the shutters, a normally closed lens on the casing, said lens being eccentrically mounted for movement in a circle to any one of a series of selected positions, said lens when in any one of said positions constituting means for projecting an image onto that portion of the film exposed by the opening of any one or all of the shutters when the lens is exposed, and separate means operated by the movement of the lens to a selected position for opening the shutter associated with said position, said means including a rock shaft, rotatable pintles movable with the respective shutters, cranks carried thereby, an operative connection between the rock shaft and the cranks, a tripping element movable in a circle with the lens and means on the rock shaft positioned for engagement and actuation by said element for actuating said shaft and moving the shutters to open position.

5. Photographic apparatus including a casing having separate compartments, a main shutter comprising opposed hingedly mounted doors having openings, separate supplemental shutters carried by the doors of the main shutter and positioned to close the openings, means in one compartment for supporting sensitized material across all of the shutters, rock shafts, a normally closed lens eccentrically mounted on the casing for circular movement to any one of a series of positions, said lens when opened at any one of said positions constituting means for directing an image into the area defined by a selected supplemental shutter, and means operated by the movement of the lens to any one of said positions for opening the shutter in the area selected to receive the image projected from the lens.

6. Photographic apparatus including a casing having separate compartments, a main shutter comprising opposed hingedly mounted doors having openings, separate supplemental shutters carried by said doors and positioned to close the openings, means in one compartment for supporting sensitized material across all of the shutters, rock shafts, a normally closed lens eccentrically mounted on the casing for circular movement to any one of a series of positions, said lens when opened at any one of said positions constituting means for directing an image into the area defined by a selected supplemental shutter, and means operated by the movement of the lens to any one of said positions for opening the shutter in the area selected to receive the image projected from the lens, said means including a slide, cranks mounted for movement with the supplemental shutters, tripping pins on the slide and between the cranks, a rock shaft, means thereon for reciprocating the slide to alternately shift the cranks and open the said shutters, tripping means movable with the lens, and means actuated thereby for rocking the shaft when the lens is brought to a predetermined position to project an image into the area exposed by the movement of the shaft and opening of a shutter.

7. Photographic apparatus including a casing, having separate compartments, shutters normally separating the compartments, a container beneath and slidably connected to the casing, there being an outlet in the bottom of one of the compartments opening into the container, means for feeding a web of sensitized material in one of the compartments past the shutters and through the outlet, a lens on the casing movable to different positions thereby to project an image upon different selected portions of the web, means operated by the movement of the lens for opening a shutter to expose that portion of the web selected to receive the image, and means within the casing and under the control of the operator for severing the exposed portion of the web at the outlet for gravitation into the container, and a closure for the container.

8. Photographic apparatus including a casing, means therein for supporting an unexposed sensitized film, a main shutter, a smaller shutter carried by the main shutter, said shutters normally excluding light from the material, a lens mounted for movement in a circle to separate selected positions in front of the respective shutters, tripping means movable in a circle with the lens, and separate means operatively connected to the respective shutters and controlled by the movement of the tripping means for opening the smaller shutter to expose that portion of the material in line with the optical axis of the lens when said lens is aligned with the smaller shutter and to open the main shutter to expose a larger area of the sensitized material to receive the image when the lens is in another position in front of the main shutter.

9. Photographic apparatus including a casing, a large main shutter therein, a smaller shutter carried by the large or main shutter, means for supporting an unexposed sensitized material in the casing back of both shutters, a lens shiftable on the casing and supported eccentrically for movement in a circle to selected positions in front of the respective shutters, and selected means controlled by the movement of the lens for opening the respective shutters separately to expose to the lens those portions of the material normally covered by the shutters, said means including tripping means movable in a circle with the lens and separate means connected to the respective shutters for transmitting motion thereto from the tripping means.

10. Photographic apparatus including a casing, a main shutter, a smaller shutter mounted thereon, means for supporting an unexposed sheet of sensitized material in the casing and back of the shutters, a lens eccentrically mounted and movable in a circle on the casing to predetermined positions in front of the material to be exposed by the respective shutters, separate means for feeding the material across the optical axis of the lens when in any one of said positions, operating means for each shutter, and means movable in a circle with the lens to any selected position for actuating one of said operating means to open the shutter in line with the lens and expose that portion of the material normally covered by the shutter.

11. Photographic apparatus including a casing, a main shutter, a smaller shutter carried thereby, means for supporting an unexposed sheet of sensitized material in the casing and back of the shutters, a lens eccentrically mounted and movable in a circle on the casing to predetermined positions in front of the respective shutters, means for feeding the sensitized material across the optical axis of the lens when the lens is in either of said positions and for projecting a portion of the sheet from the casing, shutter operating means connected to the respective shutters, means movable in a circle with the lens for shifting one of said operating means to actuate the shutter aligned with the lens and expose the material normally covered by the shutter, and means for severing the projected portion of the sheet.

12. Photographic apparatus including a casing having separate compartments, a main shutter including separate openings, smaller shutters normally closing the respective openings and carried by the main shutter, all of the shutters cooperating normally to close communication between the compartments, means for feeding sensitized material within one chamber and across the shutters, a normally closed lens mounted for movement in a circle across one end of the casing, thereby to change the position of its optical axis relative to the main shutter, said lens being eccentrically positioned relatively to its axis of movement, means controlled by the movement of the lens for opening the shutters of the respective openings in the main shutter when the optical axis of the lens is directed thereto, said means including a tripping element movable in a circle with the lens, separate rock shafts operatively connected to the respective shutters of the openings, means on the respective rock shafts for separate engagement by the tripping means, thereby to open the respective shutters of the openings in the main shutter, and means operatively connected to the main shutter and positioned for actuation by said tripping means to open the main shutter when the lens is in a predetermined position in front thereof.

JAMES ALLEN LONDON.